June 17, 1930. E. W. SCHELLENTRAGER ET AL 1,764,354
BATTERY HANDLING APPARATUS
Filed June 13, 1927  3 Sheets-Sheet 1
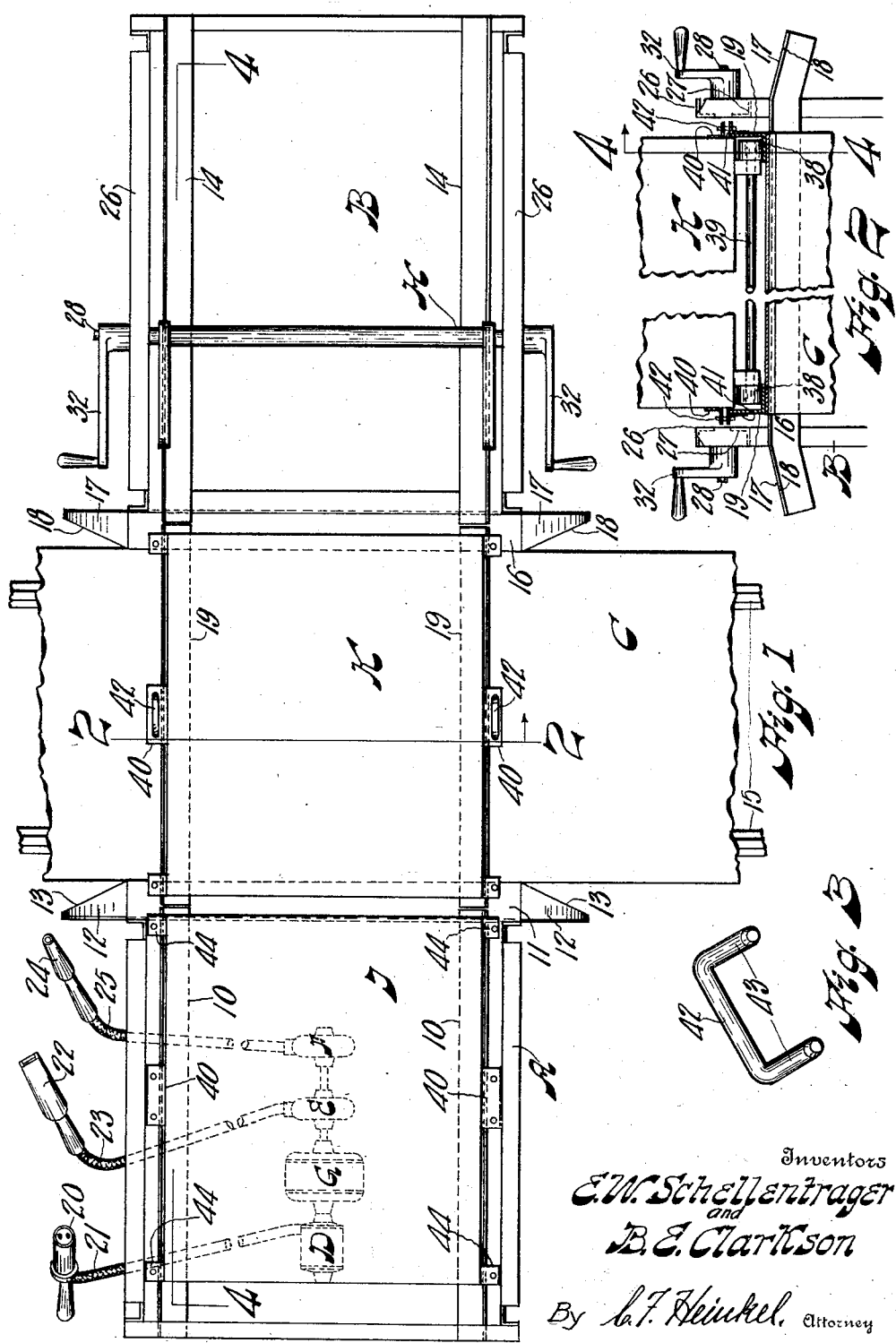

June 17, 1930.    E. W. SCHELLENTRAGER ET AL    1,764,354
BATTERY HANDLING APPARATUS
Filed June 13, 1927    3 Sheets-Sheet 2
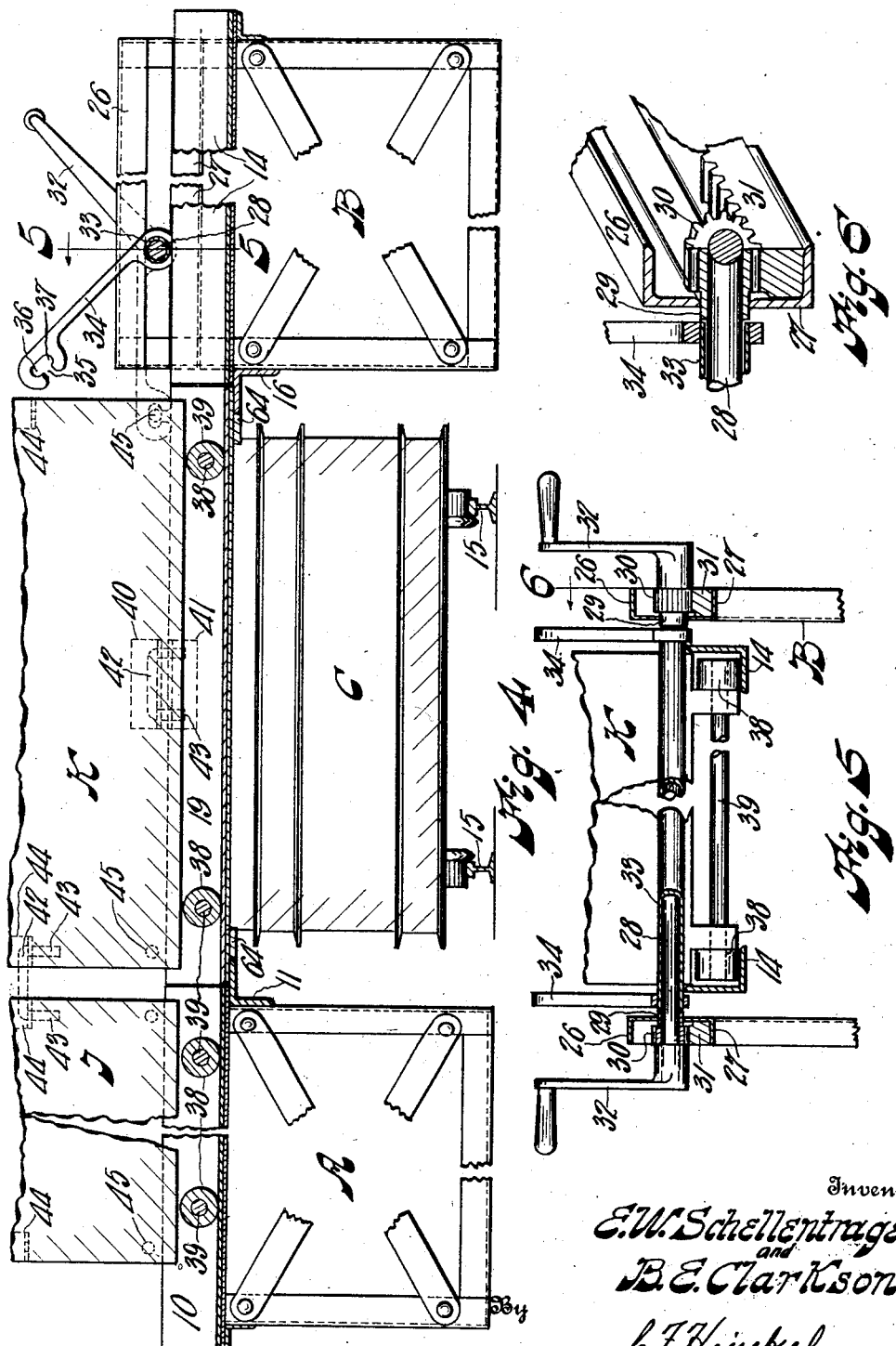

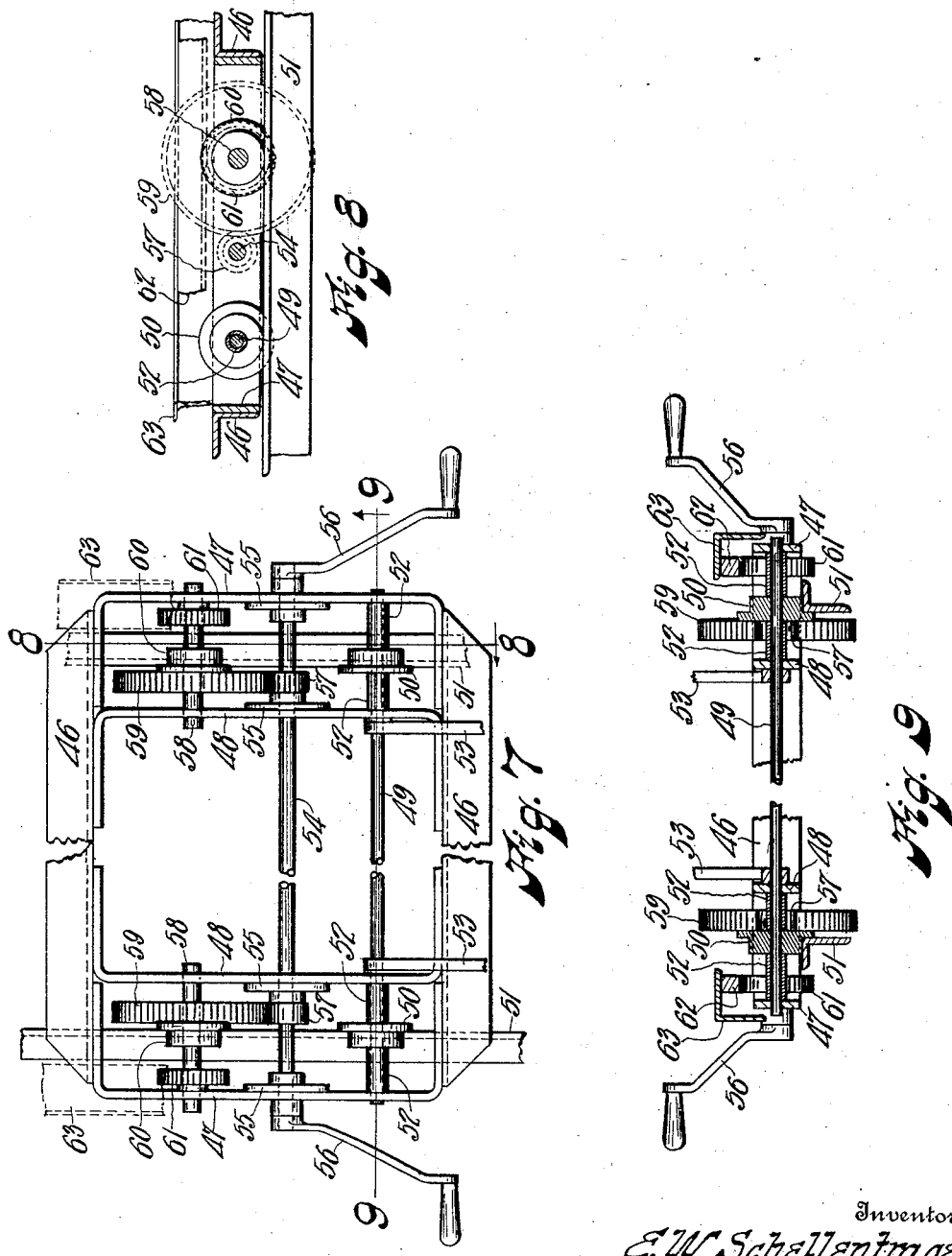

Patented June 17, 1930

1,764,354

UNITED STATES PATENT OFFICE

EUGENE W. SCHELLENTRAGER, OF SHAKER HEIGHTS, AND BRADLEY E. CLARKSON, OF CLEVELAND, OHIO, ASSIGNORS TO ATLAS BOLT & SCREW COMPANY, OF CLEVELAND, OHIO

BATTERY-HANDLING APPARATUS

Application filed June 13, 1927. Serial No. 198,650.

Our invention relates to devices or structures for handling batteries, particularly storage batteries, and more particularly storage batteries for storage battery locomotives.

One of the objects of our invention is to provide a simple, inexpensive, and convenient means for handling batteries.

Another object of our invention is to provide a simple and convenient and easily operable means to handle more than one battery in one handling operation.

Another object of our invention is to provide a simple, convenient, and easily operable means to remove a battery from a mobile element and deposit the same on a stationary element and at the same time deposit a battery from the stationary element onto the mobile element.

Another object of our invention is to provide a simple, convenient, and easily operable means to put a battery into working condition on the same element which has means for shifting or moving or transferring or otherwise handling batteries.

Another object of our invention is to provide a means for changing batteries of locomotives which means requires no overhead structure.

Another object of our invention is to provide a means for moving batteries sidewise off of and onto a mobile element and in such a manner that the mobile element as well as the batteries can be moved with a minimum of danger of injury or inconvenience to an operator.

Another object of our invention is to provide a means for moving or shifting or transferring or otherwise handling batteries with a minimum of danger of injury to the batteries.

Other objects will appear, or become apparent or obvious, or will suggest themselves during the description of the apparatus shown in the accompanying drawings.

Broadly speaking, our invention aims to change or shift or move or transfer or rejuvenate or clean or charge or otherwise put batteries into working condition in the most economical and most convenient manner and to eliminate danger of injury to the batteries as well as danger of injury or inconvenience to operators.

In order to illustrate our invention, we have embodied the same in a certain apparatus shown in the accompanying drawings; the apparatus so shown was selected to illustrate our invention and is not to be considered as a limitation of our invention or as being the only possible embodiment of our invention since we are aware that our invention can be embodied in apparatuses or devices other than the one so shown and described in this specification.

In the accompanying drawings:—

Fig. 1 is a plan view of a storage battery handling apparatus embodying the features of our invention, designed for handling storage batteries for storage battery locomotives, and shows an elevated platform on each side of a railway track, cleaning and charging means, a sectional battery track with one section on each platform and one section on a locomotive movable on the railway track, a battery on the locomotive and a battery on the platform at the left, a battery moving means on the platform at the right, and the battery guide beans with horizontally and vertically inclined ends.

Fig. 2 is a section, transversely of the platforms, taken in a vertical plane indicated by the line 2—2 in Fig. 1 and shows more clearly the battery track and the wheels on the battery on the locomotive and the clip angles to lock the battery to the track and the verically inclined ends of the battery guide element.

Fig. 3 is a perspective view of the locking member interchangeably usable for confining batteries laterally on the locomotive or for connecting batteries to each other.

Fig. 4 is a section, longitudinally of the platforms, taken in a vertical plane indicated by the line 4—4 in Fig. 2, and shows more clearly the relations of the battery track sections and the guide elements and the hook element between the carriage means and one of the batteries.

Fig. 5 is a sectional view, transversely of the platforms, taken in a vertical plane indicated by the line 5—5 in Fig. 4 and shows more clearly the relations of the shaft of the carriage and associated structures.

Fig. 6 is a sectional perspective view taken in a vertical plane indicated by the line 6 in Fig. 5 and shows more clearly the relations of the carriage shaft and the carriage moving and guiding mechanism and the arm or hook element on a sleeve.

Fig. 7 is a plan view of the battery moving carriage having a gear reduction.

Fig. 8 is a section taken in a vertical plane indicated by the line 8—8 in Fig. 7 and shows more clearly the relations of the gears and the racks and the track wheels and the battery track longitudinally of the battery track.

Fig. 9 is a section taken in a vertical plane indicated by the line 9—9 in Fig. 7 and shows more clearly the relations of the gears and the racks and the track wheels and the battery track transversely of the battery track.

Similar reference characters refer to similar parts throughout the views which pertain to each other.

The particular apparatus or device shown in the accompanying drawings comprises, principally, the battery supporting elements A and B, the mobile element C, the charging dynamo D, the water pump E, the air pump F, the motor G, and the battery moving means H.

The supporting element A is, in the present instance, an elevated platform built up of structural steel.

One portion or section of a sectional battery track means, in the present instance the rails 10 of angle iron, is supported on the platform A and extends longitudinally thereof. The inner end of each of the rails extends beyond the inner end of the platform and rests on the guide angle 11 which is secured to the inner end of the platform and extends transversely of the platform. Both ends of the angle 11 are bent downwardly at an angle so that the horizontal leg thereof forms the vertically inclined planes 12 and both of the bent portions of the horizontal leg of the angle 11 are cut away angularly so that the horizontal leg also forms the horizontally inclined planes 13. This arrangement of inclined planes provides a guide means for an element approaching transversely of the platform as will appear more definitely later on.

The supporting element B is, in the present instance, an elevated platform structure built up of structural steel.

One portion or section of a sectional battery track means, in the present instance the two rails 14 of angle iron, is supported on the platform B and extends longitudinally thereof and in alignment with the battery track section on the platform A. The lateral spacing of the rails 14 as well as the vertical positions thereof from the railway track rails 15 is the same as the lateral spacing and the vertical position of the rails 10. The inner end of each of the rails 14 extends beyond the inner end of the platform B and rests on the guide angle 16 which is secured to the inner end of the platform B and extends transversely of the platform. Both ends of the angle 16 are bent downwardly at an angle so that the horizontal leg thereof forms the vertically inclined planes 17 and both of the bent portions of the horizontal leg of the angle 16 are cut away angularly so that the horizontal leg also forms the horizontally inclined planes 18. The inclined planes on the platform B are arranged to cooperate with the inclined planes on the platform A.

The platforms A and B are spaced from each other longitudinally and the track rails 15 extend between the platforms and transversely thereof.

The mobile element C, in the present instance a storage battery locomotive shown in bare outline only, is movable on the track 15 transversely of and in between the platforms B and A.

One portion or section of a sectional battery track means, in the present instance the two rails 19 of angle iron, is supported on the locomotive and extends transversely thereof. The lateral spacing as well as the vertical distance of the rails 19 from the rails 15 is the same as the lateral spacing and the vertical distance of the rails 10 and 14 when no battery is on the locomotive. The rails 19 should be so arranged vertically that they never rise vertically sufficiently far so that they extend above the rails 10 and 14 when the locomotive is run in between the platforms either empty or loaded.

The section of the battery track means on the locomotive fits longitudinally in between the sections of the battery track means on the platforms with as little space as possible between them longitudinally and each end thereof extends beyond the corresponding side of the locomotive.

Each of the battery track sections forms a complementary section of a battery track means which is completed when the locomotive is moved in between the platforms and into such a position that the track section thereon is in longitudinal alignment with the track sections on the platforms so that a battery track means is provided upon which batteries can be moved uninterruptedly the entire length of the track means and from the locomotive onto either one of the platforms, or from either one of the platforms onto the locomotive, or from one platform to the other.

The motor G drives the charging dynamo D and the water pump E and the air pump F.

The charging plug 20 is connectable to the terminals of storage batteries and is electrically connected with the dynamo D by means of the flexible connection 21.

The nozzle 22 is connected with the pump E by means of the flexible hose 23 and the nozzle 24 is connected with the pump F by means of the flexible hose 25.

A battery can be charged by means of the motor G and the dynamo D and the plug 20, as is well known in the art, while the battery is either on the locomotive or on either one of the platforms.

A battery can be cleaned by means of liquid or of air through the motor G and the pumps E or F while the battery is either on the locomotive or on either one of the platforms. The locomotive, as well as the platforms and other elements can easily be cleaned by the same means.

The battery moving means H, in the present instance of carriage design, is movable longitudinally and guided on the platform B and is provided to enable an operator to handle batteries which he could not handle without this moving means; or at least make the handling of batteries more easy and convenient for an operator.

The carriage means shown in Figs. 1 to 6 is guided between the guide members 26 and 27, of angle iron which in the present instance, are secured to the platform B and are spaced from each other vertically.

The shaft 28 extends transversely of the platform B and carries the rollers 29 between the edges of the vertical legs of the angles 26 and 27. The shaft 28 also carries the gears 30 adjacent to the rollers 29 which gears mesh with the gear racks 31 carried by the guide rails 27. The shaft 28 also carries the cranks 32 on each end thereof to enable an operator to conveniently rotate the shaft 28.

The tube 33 telescopes over the shaft 28 and is rotatable thereon so that the hereafter mentioned arms can be swung or pivoted in a vertical plane on the shaft 28. The previously mentioned arms 34 have one end thereof secured to the tube 33 and the other and free end thereof has a slot means comprising the entrance portion 35 and the undercut portions 36 and 37 for purposes appearing presently.

The storage batteries, as the batteries J and K for instance, are provided with track wheels, in the present instance the disc rollers 38 journaled on the shafts 39 and rollable on the horizontal legs of the battery track rails 10, 14, and 19. Each battery also has the clip angles 40 on each side thereof and vertically opposite the clip angles 41 which are secured to the vertical legs of the track rails 19. Each of the clip angles 40 and 41 has two holes through the horizontal flange thereof and the vertically opposite clip angles are so spaced that the holes thereof are in alignment when a battery is located centrally on the locomotive. The lock or battery confining member 42, U-shaped in the present instance, has two prongs or legs 43 spaced the same distance apart as the holes in the clip angles 40 and 41 and are extendable through these holes so that the member 42 can be inserted and removed vertically through the holes in these clip angles and thereby retain or confine the batteries on the locomotive in a central position transversely of the locomotive.

The batteries are confined on the locomotive, longitudinally of the locomotive, by the upper ends of the vertical legs of the guide rails 19 which overlap the lower portions of the sides of the batteries. The upper ends of the vertical legs of the guide rails 10 and 14 guide the batteries in a similar manner so that the batteries are guided sidewise in their movements on the platforms as well as on the locomotive.

Each of the batteries also has the clip angles 44 on the sides near the corners thereof and each clip angle has one hole through the horizontal leg thereof. The clip angles being spaced so that one of the prongs 43 of the member 42 can be inserted into the hole in the clip angle on one battery while the other prong of the same member 42 can be inserted into the hole in the clip angle on an adjacent battery so that the two adjacent batteries can be connected to each other and moved conjointly when either one of the batteries is moved.

Each of the batteries also has the studs or pins 45 on the sides near the corners thereof and placed in such a position that the slot means in the arms 34 can be telescoped vertically over and from the same when the arms are rotated or swiveled with the tube 33 on the shaft 28 so that the carriage means can easily be connected with or disconnected from any one of the batteries.

Assuming now that the battery J in the platform A (Fig. 1) has been charged or cleaned or has otherwise been put into working condition and that the battery K on the locomotive needs re-charging or cleaning or repairs or other attention or is to be removed from the locomotive for any purpose and is to be replaced by the battery J now on the platform A.

The locomotive is first run in between the platforms A and B on the rails 15. While the locomotive is approaching the platforms, the plates 64 abut the inclined edges 13 or 18 in case the locomotive or the battery track means on the locomotive is off center and thereby pushes the battery track means transversely of the locomotive and centralizes the same so that the longitudinal ends thereof are brought in between the longitudinal inner ends of the battery tracks 10 and 14 with as little space as possible between these ends.

The battery supporting element of the locomotive is, usually, supported on springs; therefore, the battery supporting element moves vertically of the rails 15 when a battery is placed on or removed from the locomotive; therefore, the natural distance from the rails 15 vertically to the track means on the locomotive would be less or shorter when a battery is on the locomotive than it is when a battery is not on the locomotive. This condition would result in an uneven battery track when a battery is removed from or placed on the locomotive while the same is positioned in between the platforms unless some provision is made to align the track section on the locomotive with the track sections on the platforms at least when the track section on the locomotive is brought into position to complete the battery track means.

In order to provide an even track for the batteries, we arrange the battery track on the locomotive so that the same is substantially on a level with the tracks on the platforms when there is no battery on the locomotive; it is preferred that the level of the track section on the locomotive is not above the level of the track sections on the platforms and that it be rather below than above in the apparatus shown since this particular apparatus shows no means for adjusting the track section on the locomotive downwardly although such adjusting means can easily be provided if needed or desired.

When a battery is placed onto the track section on the locomotive, the level of that track section naturally drops down below the level of the track sections on the platforms while the locomotive is away from the platforms.

While the locomotive is approaching toward the platforms and is moving in between them, the projecting ends of the guide rails 19 (normally pressed down below the level of the guide rails 10 and 14 by the weight of the battery K) contact the inclined planes 12 and 17 and thereby automatically raises or elevates the guide rails 19 up to the same level as the guide rails 10 and 14 while the locomotive is being moved into a position horizontally to align all of the track sections longitudinally so that an even and continuous guide way is provided longitudinally of both platforms and transversely of the locomotive.

When it is desired to move batteries, as the batteries J and K for instance, the shaft 28 is rotated left handedly by means of the cranks 32 which rotation causes the gears 30, in mesh with the racks 31 secured to the platform B, to move the shaft 28 and the sleeve or tube 33 thereon toward the battery K to such a position that the entrance portion 35 of the slot means in the arms 34 can be swung over the pins 45 on one end of the battery K and swing the arms so the slot means thereof engages the pins. Then bodily remove the lock members 42 from the clip angles 40 and 41 and insert one of the prongs thereof into one of the clip angles 44 on the battery J and the other prongs thereof into one of the clip angles 44 on the battery K. This operation unlocks the battery K from the locomotive and connects the batteries J and K with the members 42.

After the arms 34 are swung so that the slots 35 are disposed or positioned over the pins 45, the shaft 28 is rotated right handedly whereupon the gear and rack mechanism moves the shaft and the tube thereon and the arms on the tube toward the right whereby the battery K is moved off of the locomotive and onto the platform B and the battery J is moved off of the platform A and onto the locomotive. When the arms are so moved toward the right, the undercut portions 36 of the slot means engage the pins 45 to prevent the free end of the arms from disengaging the pins while the batteries are being moved. A reverse movement of the arms causes the undercut portions 37 of the slot means to engage the pins for the same purpose and in the same manner. The just described operation also applies when a battery is located on the platform B and one on the locomotive and when these two batteries are to be interchanged or exchanged or moved except that the rotation of the cranks is reversed. In either operation, the shaft 28 is guided vertically by the rollers 29 thereon riding on the edges of the vertical legs of the angles 26 and 27 and is guided horizontally by the mesh between the teeth of the gears 30 and the racks 31.

The track wheels 38 roll on the horizontal legs of the even and continuous battery track angles so that the batteries can be moved easily and freely and without jar throughout the entire distance of the battery track and without the necessity of any adjusting or other painstaking operation except the running of the locomotive into proper position to align the track sections which can easily be done by manipulation of the locomotive control means and requires no manual moving effort. The batteries move easily by means of the wheels thereon and the cranks and the gearing of the carriage means so that an operator can readily move a battery which he could not move without such mechanism or can move batteries with less effort than without such mechanism. The crank and gearing mechanism can easily move the batteries even if the wheels are not provided on the batteries; although it is desirable to use rollers on the batteries particularly when the batteries are heavy.

When batteries are so heavy or hard to handle that one or two operators can not move or handle them with the mechanism shown in Figs. 1 to 6, the compound geared carriage means shown in Figs. 7 to 9 can be used.

In the carriage means shown in Figs. 7 to 9:—

The frame of this carriage means comprises the angle iron side pieces 46 and the flat bar end pieces 47 and 48 secured to the side pieces to form a unitary frame.

The shaft 49 is journaled in the end pieces 47 and 48 and extends transversely across the frame. The flanged track wheels 50, rollable on and guided on the battery track rails 51, are journaled on the shaft 49 between the end pieces 47 and 48 and are held in position laterally between these pieces by the tubular spacers 52 telescoped over the shaft 49.

The arms 53, similar to the arms 34 previously described, are carried by the shaft 49 and can be swung thereon or therewith similar to and for purposes similar to the arms 34.

The shaft 54 is journaled in the bearings 55 mounted on the end pieces and extends transversely across the frame; each end of the shaft 54 projects beyond the corresponding end of the frame and has the crank 56 thereon to operate the carriage means. The pinions 57 are secured to the shaft 54 in a spaced relation to each other and rotate with the shaft.

The shafts 58 are journaled in the respective end pieces 47 and 48 and each shaft extends across one pair of the end pieces. The gears 59 are secured to and rotate with the corresponding one of the shafts 58 and in mesh with and rotated by the corresponding one of the pinions 57. The flanged track wheels 60 are mounted on the corresponding one of the shafts 58 in alignment with the track wheels 50 and rollable on and guided on the track rails 51. The gears 61 are secured to and rotate with the corresponding one of the shafts 58 and mesh with the corresponding one of the racks 62 which are secured to the angles 63.

This carriage means operates to move batteries similar to the carriage means previously described except that a gear reduction is introduced to move batteries with less effort than the means previously described and that the carriage means has track wheels rollable on the battery track rails.

The apparatus shown and described enables an operator to handle batteries with a minimum of effort and to charge and clean and exchange and otherwise handle batteries in the most economical and most convenient manner, provides a simple, inexpensive, easily operable, convenient, and efficient means for handling batteries singly or in groups, and provides a means for exchanging batteries of a mobile element in one moving operation, and attains the objects aimed at in our invention.

We are aware that our invention is applicable in apparatuses or devices or structures other than the application shown and described and that changes can be made in the structure as well as in the arrangement of elements shown and described within the scope of the appended claims; therefore, without limiting ourselves to the precise application of our invention as shown and described nor to the precise structure and arrangement of elements as shown and described, we claim:

1. An apparatus of the character described including a platform having a battery track means and a locomotive having a battery track means alignable vertically as well as horizontally with said track means on the platform.

2. An apparatus of the character described including a pair of spaced platforms each having a battery track means, both of said track means being in alignment, and a locomotive movable into the space between said platforms and having a battery track means alignable vertically as well as horizontally with said track means on the platforms.

3. An apparatus of the character described including a locomotive and a vertically movable battery thereon, co-operating flange means on said locomotive and on said battery in vertically spaced relation, and a pin supported on said flanges on said battery and extending vertically through said co-operating flanges and thereby locking said battery against lateral movement while the same is on said locomotive and moving vertically with movement of said battery.

4. An apparatus of the character described including a locomotive having a pair of battery track rails extending transversely of said locomotive and each having an upwardly extending flange adapted to confine the battery longitudinally of the locomotive, a clip angle on each of said flanges, a clip angle on each side of the battery, and a pin extendable through each of the corresponding clip angles when the battery is in position on the locomotive and thereby locking the battery against movement in any lateral direction on the locomotive.

5. An apparatus of the character described including a battery track means, a plurality of batteries movable on said track means, each of said batteries having a laterally extending flange near each end thereof, and a plurality of lock members each having two legs extendable through adjacent flanges on adjacent batteries and thereby locking adjacent batteries to each other.

6. An apparatus of the character described including a battery track means having flanges thereon, a plurality of batteries movable on said track means, each of said batteries having outwardly extending flanges thereon, and an individual lock member adapted to be extended either through adjacent flanges on adjacent batteries to connect batteries to each other or through flanges on said batteries and flanges on said track means to lock batteries against movement along the track.

7. An apparatus of the character described including a battery track means having a flange fixed thereon and two spaced holes through said flange, a plurality of batteries movable on said track means, each of said batteries having a flange with two holes through the same spaced the same distance as the first said holes and also having a flange near each end thereof with a hole through each flange, and a lock member having two legs extendable either through said holes in the flanges with the two holes and thereby lock said batteries against movement on said track means, or one leg through said hole in the flange near one end of one battery and the other leg through said hole in the flange near one end of an adjacent battery and thereby connect two adjacent batteries with each other.

8. An apparatus of the character described including a battery track means, a plurality of batteries movable on said track means, cooperating flange means on said batteries and on said track means, and a lock member extendable either through co-operating flanges on adjacent batteries to thereby connect the same with each other, or through co-operating flanges on said batteries and on said track means and thereby lock said batteries against movement on said track means.

9. An apparatus of the character described including a frame, a carriage means movable on said frame to move batteries, and a rack and gear mechanism between said frame and said carriage means to move said carriage means.

10. An apparatus of the character described including a frame, a carriage means movable on said frame to move batteries, a rack and gear mechanism to move said carriage means on said frame, and lock means adapted for arbitrary connection between said carriage means and said batteries.

11. An apparatus of the character described including a frame, a carriage means movable on said frame to move batteries, a rack and gear mechanism to move said carriage means on said frame, lock means adapted for arbitrary connection between said carriage means and said batteries, and mobile lock means adapted either to positionally confine said batteries or to lock adjacently placed batteries to each other.

12. An apparatus of the character described including a battery supporting element having a battery track means, a locomotive movable adjacent to said supporting element and having a battery track means alignable with the first said track means, and means for automatically aligning both of said track means vertically by movement of said locomotive while the same is aligning said track means horizontally.

13. An apparatus of the character described including a battery supporting element having a battery track means and an inclined approach means to said track means and a locomotive movable adjacent to said supporting element and having a battery track means adapted to engage said inclined approach means to align both of said track means.

14. An apparatus of the character described including a battery supporting element having a battery track means and an inclined approach means to said track and disposed transversely of the track means and a locomotive movable adjacent to said supporting element and transversely of said track means and having a battery track means extending transversely of the locomotive and adapted to engage said inclined approach means to align both of said track means.

15. An apparatus of the character described including a battery supporting element having a battery track means and an inclined approach means to said track means at each side of said track means and a locomotive movable adjacent to said supporting element from either side of said track means thereon and having a battery track means adapted to engage said inclined approach means to align both of said track means.

16. An apparatus of the character described including a pair of spaced battery supporting elements each having a battery track means, each of said track means having an inclined approach means to said track means, both of said track means being in alignment, both of said approach means being positionally parallel, and a locomotive movable into the space between said supporting elements and having a battery track means adapted to engage both of said approach means to align said track means on the locomotive with said track means on said supporting element.

17. An apparatus of the character described including a pair of spaced elements each having a battery track means, each of said track means having an inclined approach means to said track means at each side of said track means, both of said track means being in alignment, both of said approach means being positionally parallel, and a locomotive movable into the space between said spaced elements from either side of said track means thereon and having a battery track means adapted to engage said inclined approach means to align said track means on the locomotive with said track means on said spaced elements.

18. An apparatus of the character described including a pair of spaced elements having aligned track means, a locomotive movable into the space between said spaced elements and having a track means, means for aligning said track means on said locomotive with said track means on said spaced elements, a carriage means movable on one of said spaced elements, a battery on said track means on said locomotive, a battery on said track means on the other one of said spaced elements, a connector means to connect said carriage means and said battery on said locomotive, connector means to connect both of said batteries, and means to move said carriage means to move said battery on said locomotive off of said locomotive and on to said one platform and said battery on said other platform off of said other platform and onto said locomotive.

19. An apparatus of the character described including a pair of complementary track means spaced apart longitudinally and fixed positionally and a complementary track means movable positionally into the space between the first mentioned track means and into horizontal alignment with the same and into vertical alignment with the same by said movement thereof and thereby form all of said track means into a continuous and even and aligned track means.

20. An apparatus of the character described including a pair of stationary complementary track means spaced apart longitudinally, a complementary track means movable laterally into the space between the first mentioned track means and into lateral alignment with the same and into vertical alignment with the same by said movement thereof and thereby form all of said track means into a continuous and even and aligned track means, batteries movable on said track means, and means for moving said batteries on said track means.

21. An apparatus of the character described including a stationary element to support batteries, a mobile element movable adjacent to said stationary element from either direction and having a removable battery, and means for shifting a battery off of said mobile element and onto said stationary element and shifting a battery off of said stationary element and onto said mobile element in either one of two opposite directions.

22. An apparatus of the character described including a sectional battery track having a movable section automatically aligning itself with another section of the track by means of movement thereof.

23. An apparatus of the character described including a sectional battery track having a section movable transversely and vertically of another section of the track.

24. An apparatus of the character described including a sectional battery track having a movable section and means for automatically moving said section vertically while the same is being moved horizontally.

25. An apparatus of the character described including a sectional battery track having a transversely movable section and means on said sections for automatically guiding said movable section into a space between two other sections of the track.

26. An apparatus of the character described including a sectional battery track having a movable section and means for automatically guiding said section into a space between two other sections of the track and automatically aligning said movable section with said other sections.

27. An apparatus of the character described including a sectional battery track having a movable section automatically alignable with another section of the track during movement of said movable section.

28. An apparatus of the character described including a sectional battery track having one section thereof mounted on a mobile element, another section thereof mounted on a stationary element, and means between said sections for automatically aligning said one section with said other section during movement of said mobile element.

29. An apparatus of the character described including a sectional battery track having a movable section and a stationary section and vertically inclined means and means engageable on said inclined means between said sections.

30. An apparatus of the character described including a sectional battery track having a movable section and a stationary section and horizontally inclined means and means engageable on said inclined means between said sections.

31. An apparatus of the character described including a sectional battery track having a movable section and a stationary section and vertically and horizontally inclined means and means engageable on said inclined means between said sections.

32. An apparatus of the character described including a plurality of battery supporting structures, one of said structures being movable in relation to the others of said structures, means to align said movable structure with said other structures while the same is being moved into co-operative relation to said other structures to permit batteries to be moved in two directions from any one of said structures onto any other one of said structures in one moving operation, and a battery moving means on one of said structures and having means to move batteries in said two directions.

33. A battery handling apparatus including a platform, a locomotive adapted to be moved adjacent to said platform and having a battery thereon, and means between said platform and said locomotive for engagement through movement of said locomotive to align the bottom of said battery with the top of said platform for removal of said battery from said locomotive.

34. A battery handling apparatus including a platform having a battery on the top thereof, a locomotive adapted to be moved adjacent to said platform and having a battery thereon, and means between said platform and said locomotive for engagement through movement of said locomotive to align the bottom of said battery with the top of said platform for exchange of said batteries.

35. A battery handling apparatus including a platform, a locomotive adapted to be moved adjacent to said platform and having a battery thereon, members transversely of said locomotive to laterally confine said battery longitudinally of said locomotive, axially vertical removable pins to laterally confine said battery transversely of said locomotive, and means between said platform and said locomotive for engagement through movement of said locomotive to move said battery vertically for alignment of the bottom thereof with the top of said platform for lateral removal of said battery.

36. A battery handling apparatus including a platform having a battery on the top thereof, a locomotive adapted to be moved adjacent to said platform having a battery thereon, members transversely of said locomotive to laterally confine said battery longitudinally of said locomotive, axially vertical removable pins to laterally confine said battery transversely of said locomotive, and means between said platform and said locomotive for engagement through movement of said locomotive to move said battery vertically for alignment of the bottom thereof with the top of said platform for exchange of said batteries.

37. A battery handling apparatus including a platform having a battery on the top thereof, a locomotive adapted to be moved adjacent to said platform and having a battery thereon, means between said platform and said locomotive, for engagement through movement of said locomotive to move said battery vertically for alignment of the bottom thereof with the top of said platform for exchange of said batteries, and vertically movable members for connection and disconnection of said batteries and of said batteries and said locomotive.

38. A battery handling apparatus including a platform having a battery on the top thereof, a locomotive adapted to be moved adjacent to said platform and having a battery thereon, means between said platform and said locomotive, for engagement through movement of said locomotive to move said battery vertically for alignment of the bottom thereof with the top of said platform for exchange of said batteries, and a battery moving device having a member movable for vertical connection with a battery.

39. A battery handling apparatus including a platform having a battery on the top thereof, a locomotive adapted to be moved adjacent to said platform and having a battery thereon, means between said platform and said locomotive, for engagement through movement of said locomotive to move said battery vertically for alignment of the bottom thereof with the top of said platform for exchange of said batteries, vertically movable members for connection and disconnection of said batteries and of said batteries and said locomotive, and a battery moving device having a member movable for vertical connection with a battery.

In testimony of the foregoing we affix our signatures.

EUGENE W. SCHELLENTRAGER.
B. E. CLARKSON.